Dec. 4, 1934.                S. G. BAITS                 1,983,063
                      MOTOR VEHICLE TRANSMISSION
                        Filed Feb. 2, 1932        3 Sheets-Sheet 2
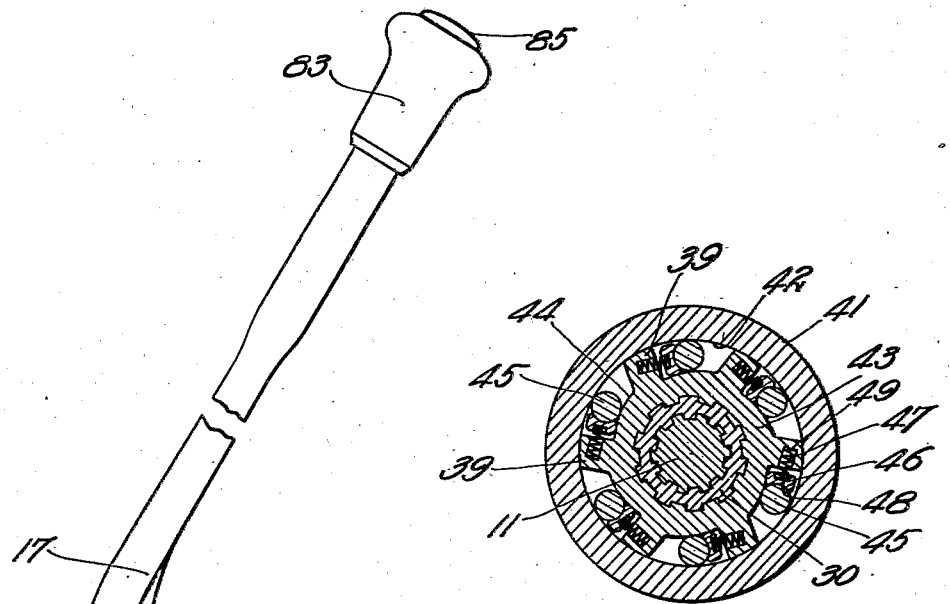
Fig_6_
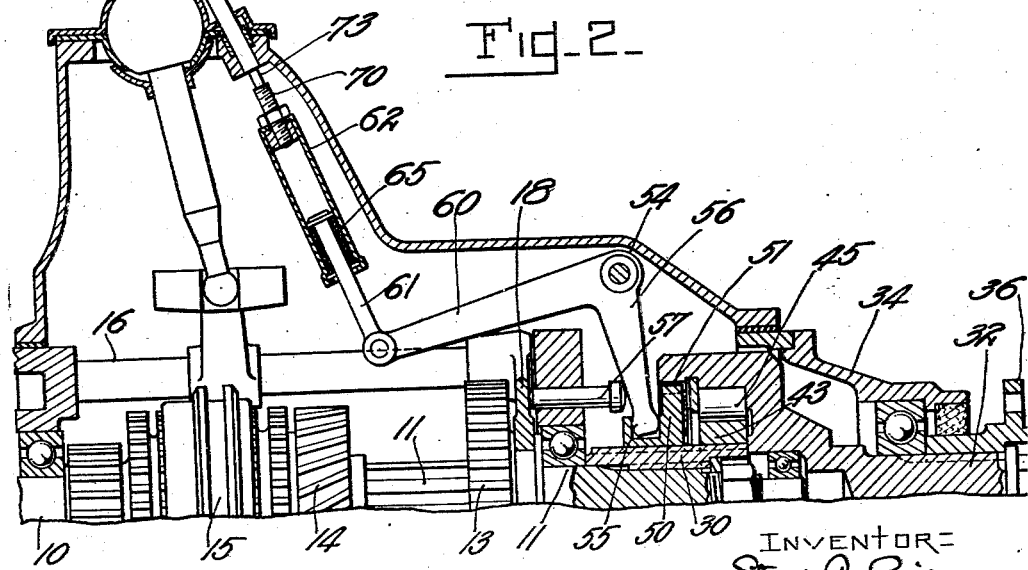
Fig_2_

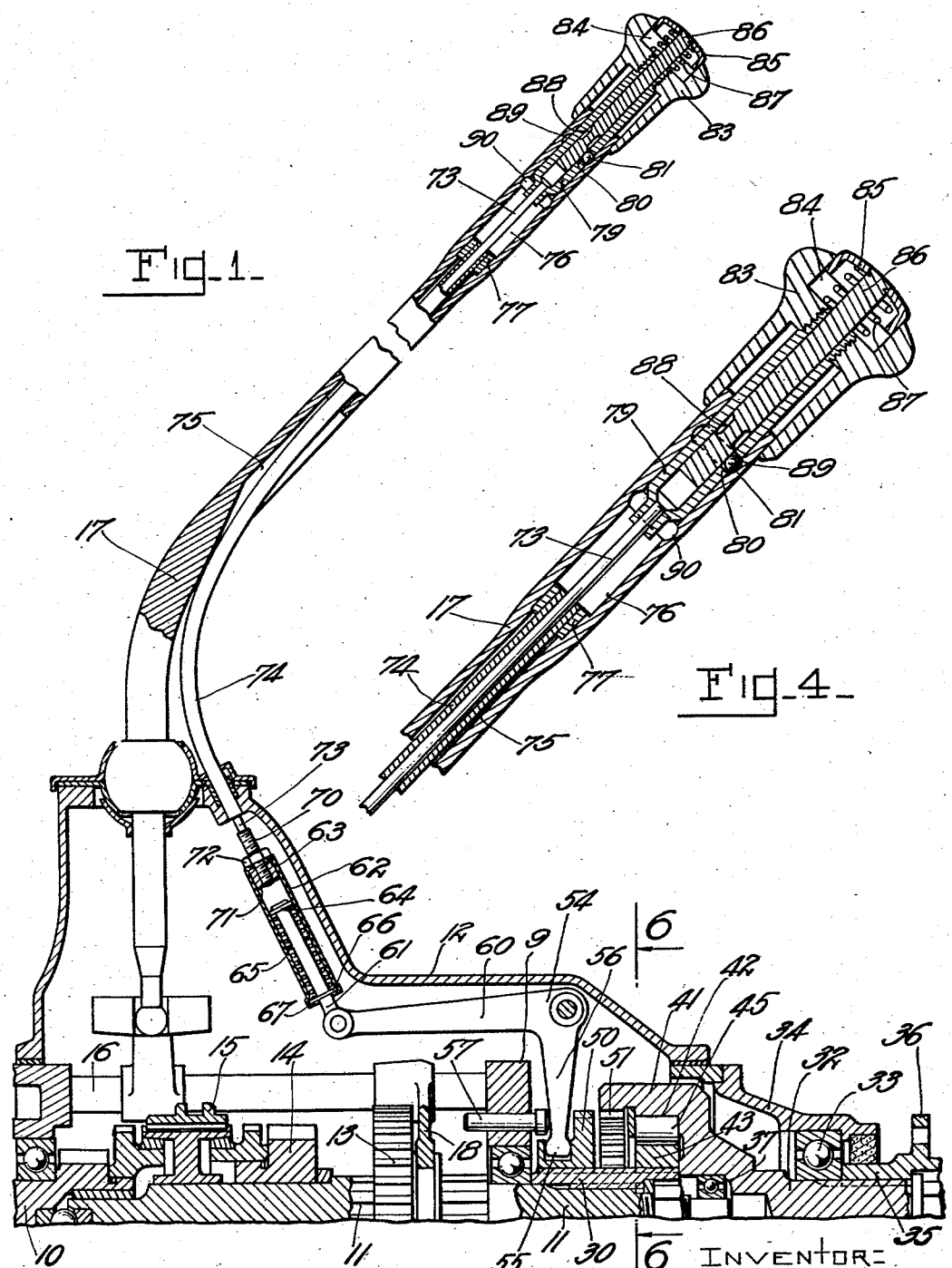

Dec. 4, 1934.  S. G. BAITS  1,983,063
MOTOR VEHICLE TRANSMISSION
Filed Feb. 2, 1932  3 Sheets-Sheet 3
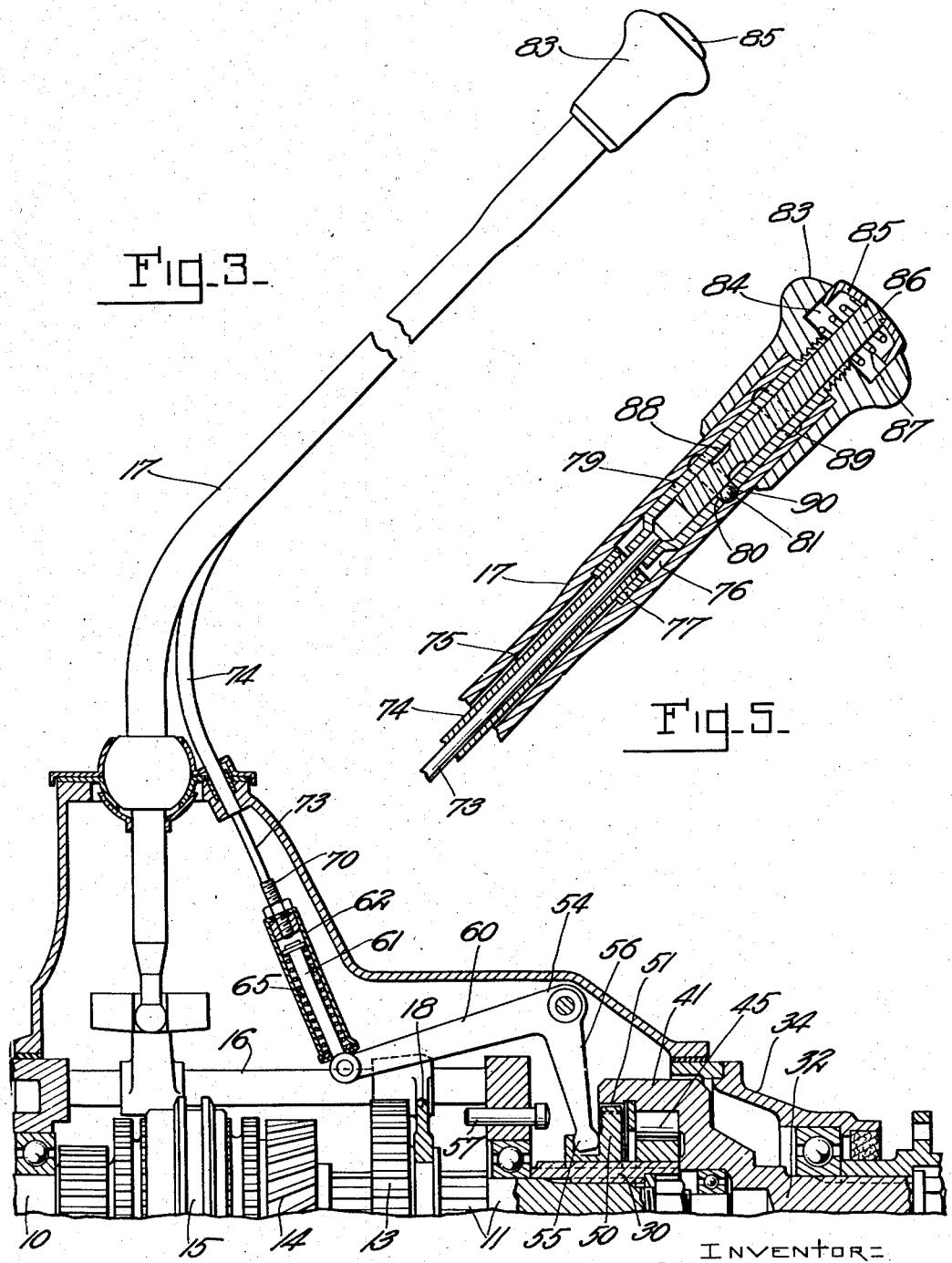

Patented Dec. 4, 1934

1,983,063

UNITED STATES PATENT OFFICE 1,983,063

MOTOR VEHICLE TRANSMISSION

Stuart G. Baits, Grosse Pointe Park, Mich., assignor to Hudson Motor Car Company, Detroit, Mich., a corporation of Michigan Application February 2, 1932, Serial No. 590,431

3 Claims. (Cl. 74—343)

This invention relates to mechanism for transmitting the power of the engine of a motor vehicle to the driven wheels thereof, and more particularly to such mechanism which includes, in addition to the usual change speed gearing, means, commonly known as free wheeling mechanism, for effecting such a connection between said gearing and the driven wheels as to provide a positive drive in one direction only or in both directions.

It is the object of the present invention to provide simple but effective means for controlling the free wheeling unit of a mechanism of this sort, which can be easily and conveniently operated at the will of the driver, which can be securely locked in either of its adjusted positions, but which is of such a character as to be rendered automatically operative to transmit the reverse drive when the change speed gearing is shifted into reverse.

These and other objects of the invention will be more clearly understood from the following description of a preferred embodiment thereof, chosen for illustrative purposes, and shown in the accompanying drawings: in which, Figs. 1, 2 and 3 are longitudinal vertical sectional views of mechanism, embodying the invention, for connecting certain driving and driven parts of a motor vehicle;

Figs. 4 and 5 are detail sectional views, corresponding respectively to Figs. 1 and 3 of the means for locking the free wheeling unit in inoperative and operative positions, respectively; and Fig. 6 is a transverse section of the free wheeling unit taken substantially on the line 6—6 of Fig. 1.

In the accompanying drawings, one embodiment of the invention is illustrated in conjunction with a variable speed transmission gearing of common construction having a two-part main transmission shaft comprising alined driving and driven sections 10 and 11, respectively, journalled in suitable bearings in the transmission casing 12. The driven section 11 is provided with suitable gears 13 and 14 which cooperate selectively with complementary gears on the usual jack shaft (not shown) driven from the driving section 10. The gear 13 is splined to the shaft section 11 and is movable thereon forwardly or toward the left, into mesh with a suitable gear on the jack shaft to produce the first or low speed drive, and rearwardly, or toward the right, into mesh with the usual idler pinion (not shown) for the reverse drive. The construction shown is of the type wherein the gear 14 is in constant mesh with its coacting jack shaft gear, and there is provided a clutch hub 15 movable rearwardly, or toward the right, to clutch said gear to the shaft section 11 for the intermediate or second speed drive, and forwardly, or toward the left, to connect the shaft sections 10 and 11 for the direct or high speed drive. The gear 13 and clutch hub 15 are operated, through forks 18 on the usual shifter slides, one of which is shown at 16, by the usual gear shift lever 17. As thus far referred to, the transmission mechanism may be of any standard or suitable construction and arrangement, and its operation will be familiar to those skilled in the art without further description in detail.

In accordance with the present invention, the free wheeling unit is separate from the change speed gearing (in the sense of not being immediately associated with any of the transmission gears thereof) and is arranged to connect a sleeve 30, secured upon the rear end of the main transmission shaft section 11, and a shaft 32 journalled in ball bearings 33 within a rear extension 34 of the casing 12. A sleeve 35 is secured upon the shaft 32 near its rear end and is provided with an annular flange 36 by which it may be secured to the front universal (not shown). The other end of the shaft 32 is provided with a recess adapted to receive ball bearings 37 for rotatably supporting the rear end of the main transmission shaft section 11. The shaft 32 is provided with a hollow annular portion 41 extending forwardly and surrounding the sleeve 30. The portion 41 is provided with internal teeth 51 forming one element of a two-way clutch and also is provided with an internal cylindrical surface 42 forming one element of a one-way clutch. The other element of the one-way clutch comprises a sleeve 43 secured upon the sleeve 30 and having a plurality of longitudinally and outwardly extending ribs 39 (Fig. 6) between which are formed cam faces 44. A roller 45 is positioned in each of the wedge shaped pockets formed by the cam faces 44 and cylindrical surface 42. Each of the rollers 45 is engaged by a shoe 46 held resiliently in engagement therewith by a spring 47, the opposite ends of which are received in recesses 48 and 49 in the shoe and rib 39 respectively. A hub 50 having external teeth forms the other element of the two-way clutch and is splined upon the sleeve 30 so that it may be moved axially thereof to carry its teeth into and out of engagement with the internal teeth 51.

The free wheeling unit may be adjusted by mechanism preferably carried by the gear shift lever 17 and which may be arranged to lock the free wheeling unit in operative or in inoperative position, that is to say, in position to provide a one-way or a two-way drive. In the embodiment illustrated, the shift lever 17 is provided with communicating bores 75 and 76 extending from the upper end of the lever 17 and piercing the side wall of the lever adjacent the top of the casing 12. A flexible guide 74 extends through the bore 75 and is secured at its upper end to a sleeve 77 resting upon the bottom of the bore 76. The lower end of the guide extends through the top of the casing 12 and is secured thereto. A flexible rod 73 in the nature of a Bowden wire, is slidably positioned within the conduit 74 and is secured at its upper end to one end of a sleeve 79 which is slidably mounted within the bore 76. The wall of the sleeve 79 is provided with an opening 80 adapted to receive a ball 81. The other end of the sleeve 79 is threaded in a cap or knob 83 which is slidably mounted upon the upper end of the shift lever 17. The top surface of the cap 83 is provided with a recess 84 adapted to receive a movable button 85 which is secured to the upper end of a rod 86 slidably mounted within the sleeve 79. The button 85 is normally held in raised position by a spring 87 surrounding the rod 86 and extending between the button 85 and the bottom of the recess 84. The rod 86 is provided with an annular groove 88 arranged thereon so that it may be brought opposite the ball 81. The bore 76 also is provided with similar spaced annular grooves 89 and 90 for a purpose described hereinafter.

A yielding connection is provided between the flexible rod 73 and the two-way clutch element 50 of the free wheeling unit. For this purpose, the lower end of the flexible rod 73 is secured to a threaded member 70 which passes into the upper end of a tube 62. The member 70 is secured to the tube 62 by nuts 71 and 72 engaging opposite sides of an inturned flange 63. A bell crank 54 pivotally mounted within the casing 12 is arranged with the free end of one arm 56 engaging an annular groove 55 in the hub 50. The free end of the other arm 60 of the bell crank is pivotally connected to one end of a rod 61 which extends into the lower end of the tube 62. The other end of the rod 61 is provided with a head 64 adapted to engage one end of a spring 65 surrounding the rod 61 and having its other end in engagement with the washer 66 surrounding the rod and held in the crimped end 67 of the tube 62. A plunger 57 is slidably mounted in an internal wall 9 of the casing 12 and is adapted to be moved into engagement with the arm 56 of the bell crank 54 for a purpose described hereinafter.

The shift lever 17, as usual, is adapted to be moved to shift the variable speed transmission gearing to cause the vehicle to move either in high, low, intermediate or reverse speeds. The free wheeling unit may be adjusted at any time except when the transmission is shifted to reverse speed.

In Fig. 3, the free wheeling unit is shown in its inoperative position with the elements 50 and 51 of the two-way clutch in engagement, thus causing the shaft 32 to move in unison in both directions with the main transmission shaft section 11. As shown in Fig. 5, the ball 81 is lodged between the hole 80 and annular groove 90, thus locking the free wheeling unit in its inoperative position. If, it is desired to adjust the free wheeling unit to its operative position, as shown in Fig. 1, the button 85 is depressed to bring the annular groove 88 opposite the ball 81 thus permitting the latter to enter the groove and permit the sleeve 79 to be moved longitudinally of the shift lever 17. The knob 83 is now moved to the position shown in Figs. 1 and 4, and the button 85 released, whereupon the ball 81 is trapped between the opening 80 and the annular groove 89, thus locking the flexible rod 73 and mechanism connected thereto in the positions shown in Fig. 1. The aforementioned movement of the flexible rod 73 causes movement of the bell crank to move the teeth of the hub 50 out of engagement with the teeth 51, thus rendering the one-way clutch formed by the clutch elements 42 and 43 operative.

If it is desired again to render the free wheeling unit inoperative, the button 85 is depressed to unlock the knob 83 and permit it to be moved downwardly along the lever 17 until the ball 81 is opposite the annular groove 90 as shown in Fig. 5. The button 85 is then released causing the ball to be trapped between the opening 80 and the annular groove 90, thus locking the flexible rod 73 in the position to which it has been moved. The downward movement of the flexible rod 73 causes the bell crank to rotate counterclockwise and move the teeth of the clutch element 50 into engagement with the teeth 51, thus operatively locking the shafts 11, 32 as shown in Fig. 3.

If the free wheeling unit is in its operative position, as shown in Fig. 1, and the variable speed transmission gearing is shifted into reverse, the gear 13 is moved rearwardly, or to the right, as viewed in Figs. 1, 2 and 3, by the gear shift lever 17 acting through the proper shifter slide 16, causing the fork 18 on said slide to engage the plunger 57 and cause the latter to engage the arm 56 of the bell crank 54 and move the teeth on the hub 50 into engagement with the teeth 51, thereby automatically rendering the free wheeling unit inoperative. This action is permitted by the yielding connection between the rod 61 and the flexible rod 73 regardless of the fact that the knob 83 is at this time locked in the position to render the free wheeling unit operative.

Having thus described my invention, I claim:

1. In a motor vehicle, having variable speed transmission gearing including a transmission element shiftable into a position to effect the reverse drive, a lever for shifting said gearing, a one-way clutch through which power is transmitted from said gearing to the vehicle, and a two-way clutch through which power may be transmitted in both directions independently of said one-way clutch, the combination therewith of a handle longitudinally movable on said lever, means for locking said handle to said lever, a flexible rod connected with said handle and extending longitudinally of said lever, a lever for operating said two-way clutch, and a yielding connection between said last named lever and said rod permitting movement of said lever in opposite directions with said rod and movement of said lever relative to said rod.

2. In a motor vehicle having variable speed transmission gearing including a transmission element shiftable into a position to effect the reverse drive, a free wheeling unit through which power is transmitted from said gearing to the vehicle, the combination therewith of manually operable means shiftable to either of two positions for adjusting said free wheeling unit whereby power is transmitted in one direction when said means is in one position and power is transmitted in both directions when said means is in the other position, said manually operable means including a resilient connection permitting independent adjustment of said free wheeling unit, means operated by said shiftable element when moved into reverse drive position for adjusting said free wheeling unit to transmit the power in both directions, and manually releasable means for locking said manually operable means in either of its said positions, said resilient connection acting to adjust said free wheeling unit to transmit power in one direction when said shiftable element is moved out of its reverse drive position.

3. In a motor vehicle having variable speed transmission gearing including a transmission element shiftable into a position to effect the reverse drive, a free wheeling unit through which power is transmitted from said gearing to the vehicle, and a lever for shifting said gearing, the combination therewith of manually operable means shiftable to either of two positions for adjusting said free wheeling unit whereby power is transmitted in one direction when said means is in one position and power is transmitted in both directions when said means is in the other position, means operated by said shiftable element when moved into reverse drive position for adjusting said free wheeling unit to transmit power in both directions, said manually operable means comprising a handle longitudinally movable on said lever, a flexible rod connected with said handle and extending longitudinally of said lever, a lever for adjusting said free wheeling unit, a connection between said last named lever and rod permitting movement of said lever in opposite directions with said rod and movement of said lever relative to said rod, and manually releasable means for locking said handle in either of its said positions.

STUART G. BAITS.